W. J. Hotchkiss,
Chain Link,
Nº 31,021.     Patented Jan. 1, 1861.
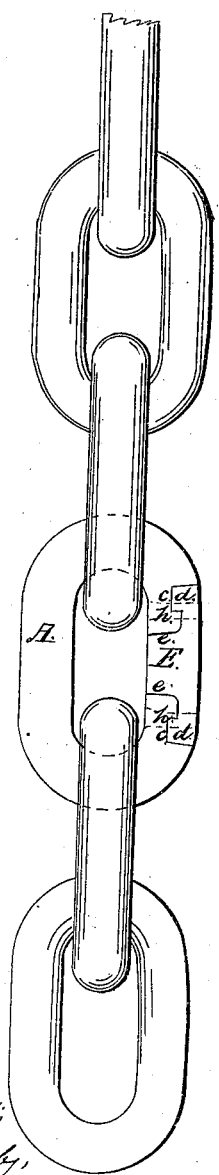
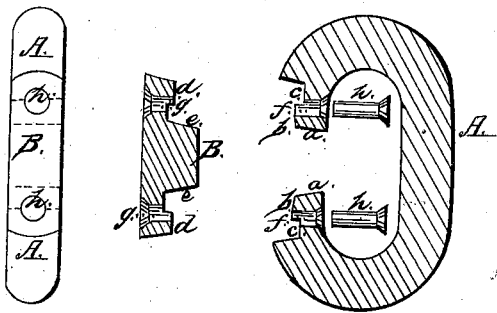
Witnesses:
J. W. Coomby,
R. S. Spencer.
Inventor,
W. J. Hotchkiss,
per Munn & Co.
Attorneys.

UNITED STATES PATENT OFFICE.

W. J. HOTCHKISS, OF DERBY, CONNECTICUT.

LINK SHACKLE OF CHAIN CABLES.

Specification of Letters Patent No. 31,021, dated January 1, 1861.

*To all whom it may concern:*

Be it known that I, W. J. HOTCHKISS, of Derby, in the county of New Haven and State of Connecticut, have invented a new and Improved Link Shackle for Cables and other Chains; and I do hereby declare that the following is a full, clear, and exact description of the same, reference being had to the accompanying drawings, forming part of this specification, in which—

Figure 1, is a side view of my improved shackle exhibiting it in a chain. Fig. 2, is an edge view of the shackle. Fig. 3, exhibits a section of the shackle with two movable side pieces detached.

Similar letters of reference indicate corresponding parts in the several figures.

The ordinary shackle used to connect cables with anchors and to connect two pieces of chain or supply the place of a broken link in cases where it is inconvenient to insert a new link by welding, consists of a stirrup like bow with two eyes at its extremities, having a pin inserted through them making a very cumbrous and awkward attachment.

My improvement consists in a peculiar construction of the link and a movable side piece.

A, is the principal portion of the shackle made in the form of a chain link with a sufficient portion of one side removed for the introduction of another link, and having a recess in its exterior at each end of its opening $a$, $a$, and having a mortise or groove $c$, in each recess $b$.

B, is the separate or movable side piece made of a piece of round rod, or bar iron, of the same thickness as the principal portion A, made to fit the opening $a$, the recesses $b$, $b$, and the mortises or grooves $c$, $c$, of the principal portion A; the part $e$, $e$, fitting as a tenon into the opening $a$ $a$, and the tenons $d$, $d$, fitting to the mortises or grooves $c$, $c$, in such a manner as to sustain the ends of the portion A, against the strain to which it is subject. The portion A, and the piece B, are drilled correspondingly and countersunk, as shown at $f$, $f$, and $g$, $g$, for the reception of two rivets $h$, $h$, which secure the piece B, in its place and make the shackle like a solid link.

What I claim as my invention and desire to secure by Letters Patent, is;

The construction of the link A and the movable side piece B with apertures and hook formed tenons in their extremities in the manner and for the purposes herein shown and described.

W. J. HOTCHKISS.

Witnesses:
S. G. WILCOXSON,
SAMUEL H. FRENCH.